Feb. 19, 1935.  H. KETEL  1,991,684
CUSHION TOW HOOK
Filed June 13, 1932
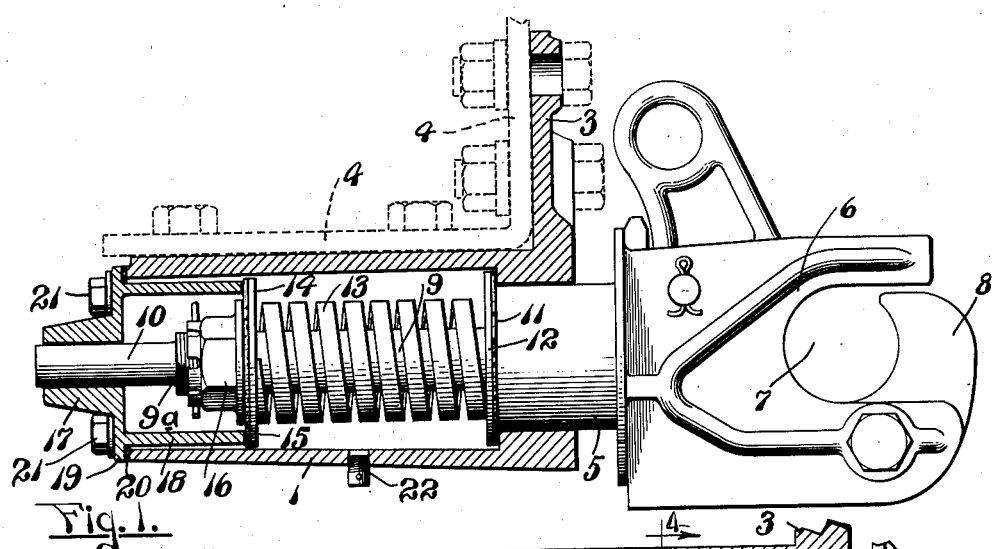
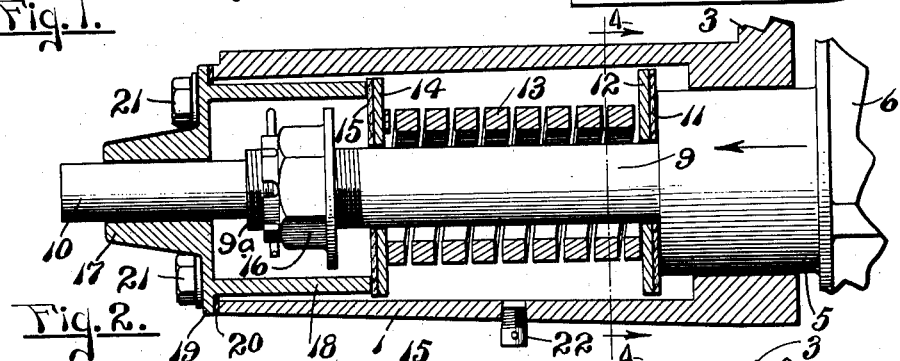
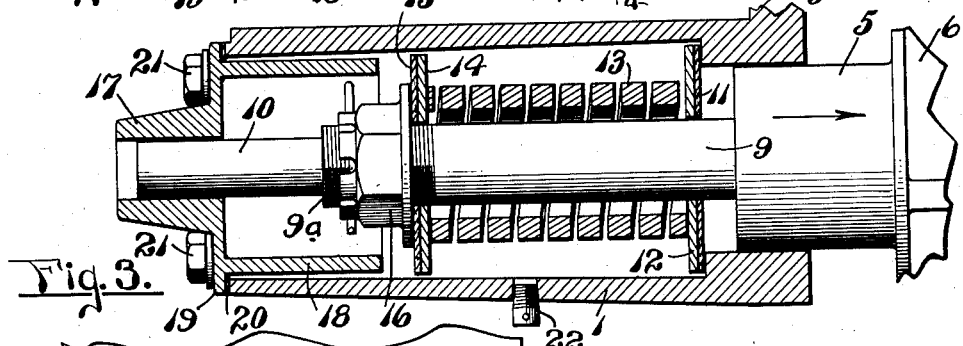
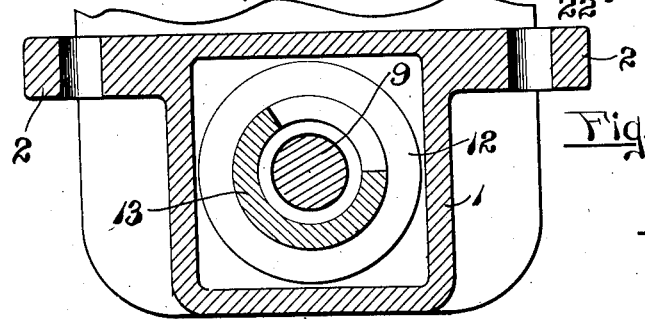
Inventor
Henry Ketel
By Liverance and
Van Antwerp
Attorneys Patented Feb. 19, 1935

1,991,684

UNITED STATES PATENT OFFICE 1,991,684

CUSHION TOW HOOK

Henry Ketel, Holland, Mich., assignor to Holland Hitch Company, Holland, Mich., a corporation of Michigan Application June 13, 1932, Serial No. 616,950

5 Claims. (Cl. 280—33.9)

This invention relates to a cushion tow hook, particularly useful for application to vehicles such as trailers or other heavy vehicles which are to be towed and wherein the towing instrument may consist of a motor truck, tractor or other automotive construction of any suitable character. The present invention is designed to be connected to the appliance or device, such as a trailer, which is towed and to have a detachable connection with the towing apparatus.

In the operation of towing the heavy vehicle, such as a trailer, by a truck or tractor, there occurs many times abrupt jerks between the truck and trailer, and it is desirable that these jerks and the heavy strains which occur therefrom be taken care of and cushioned so as not to be transmitted directly from the towing hook to the frame of the truck or tractor with a resultant liability of rupture or other damage by reason of the very heavy strains produced. It is further very desirable that the cushioning of the tow hook be maintained at all times and not become defective or destroyed by reason of dirt, rust or the like getting into and interfering with the cushioning mechanism. For though a cushioning tow hook may be perfect in its operation when new and first applied, if by reason of lack of lubrication, rusting or the accumulation of dirt in places so as to obstruct the operation of the cushioning mechanism, the hook becomes inoperative as to its cushioning, it is then no better than a tow hook directly connected to the frame of the truck or tractor without cushioning members to receive and absorb abrupt jerks and strains which frequently occur.

It is a primary object and purpose of the present invention to provide a cushion tow hook in which the cushioning elements used, and particularly a heavy compression spring providing one of said elements, are housed and protected at all times against defects of rusting, or the accumulation of dust, or splashing of mud or the like therein and which may be kept continuously lubricated at all times so that its functions will not be either lessened or destroyed by reason of rust, accumulations of dirt or mud or any other cause due to exposure in the elements. It is a further object of the invention to provide a hook which is of a very practical and durable construction and which is fully capable of withstanding the severe usage to which it is subjected in service.

An understanding of the invention and the objects and purposes attained thereby may be had from the following description, taken in connection with the accompanying drawing, in which, Fig. 1 is a longitudinal vertical section through the cushioning tow hook of my invention, there being indicated in dotted lines the manner in which it is secured to the vehicle to which it is attached.

Fig. 2 is a similar somewhat enlarged section illustrating the position of the parts when the towing device is backed toward and against the trailer.

Fig. 3 is a section like that shown in Fig. 2 showing the normal position of the parts while the towing is in progress, and Fig. 4 is a fragmentary enlarged transverse section through the cushion tow hook of my invention, this view being taken along the line 4—4 of Fig. 2.

Like reference characters refer to like parts in the different figures of the drawing.

In the construction shown a somewhat elongated housing 1 of cast metal is provided, substantially square in cross section, and having lateral attaching ears or flanges 2 at its top projecting outwardly from its sides; and at its front end it is formed with an integral vertical wing 3 whereby the housing may be secured by bolts or the like to a suitable member 4, shown in dotted lines in Fig. 1, of a truck or the like which is to carry the device. The bolts pass through the flanges or ears 2 and through the wing 3 and a secure and permanent connection may be made until it is desired to remove the same which can be done by disconnecting the bolts.

The housing 1 is hollow, open at its front end, and at its rear end has a large cylindrical opening through which an enlarged cylindrical section 5 of a hook carrying member passes. The section 5 is somewhat longer than the thickness of the metal at the rear end of the housing 1, and at its rear end carries a disconnectible hook apparatus, including a rigid housing 6, recessed at 7 to receive a part of a clevis or rod carried by the trailer and with a hook 8 pivotally mounted which may pass across the open end of the recess 7 and be held in operative position as shown in Fig. 1. The hook also may be released to turn downwardly to an inoperative position. The specific construction of the releasable hook carrying end of the appliance is not concerned with the present invention as it is old and well known.

From the front end of the enlarged cylinder section 5 a cylindrical rod 9, integral therewith or permanently secured so as to be in effect integral, extends and terminates in a still smaller rod 10. The inner end of the part 9 is threaded for a distance as indicated at 9a. A felt lubricant retaining gasket 11 has an opening through which the rod 9 passes against which the metal washer 12 is placed, the gasket 11 being designed to bear against the end of the housing 1 around the opening through which the section 5 passes. A heavy coiled compression spring 13 is located around the rod 9, one end against the washer 12 while the other end bears against a second metallic washer 14 which is faced at its outer side with a second fabric gasket 15; and a castellated nut 16 threads onto the part 9a and is held against rotation after it has reached the desired position by a cotter pin as shown.

The open end of the housing 1 is closed by a member including a central boss 17 centrally bored to receive the projecting smaller rod portion 10 and having a cup-like head or reservoir member 18 integral therewith which inserts into the open end portion of the housing 1. This closure includes an angular flange 19 between which and the end of the housing 1 a gasket 20 is placed and the closure member described is secured in place by cap screws 21.

In the lower side of the housing 1 an opening is made and a lubricant entrance fixture 22, such as is frequently used in conjunction with lubricating bearings and the like, is threaded into said opening to which any suitable grease gun may be detachably connected to force grease or other lubricant into the housing and around the spring 13 between the plates 12 and 14 and the gaskets 11 and 15. Thus the quantity of lubricant which may be inserted is definitely limited although diffusion of the lubricant is had at each end of the device during its operation, such occurring during the respective movements of the plates 12 and 14.

In the assembly of the device the member consisting of the hook housing with the hook mounted thereon, the part 5, rod 9 and the smaller diameter extension 10 thereto is inserted through the rear end of the housing 1. The gasket 11 and the washer 12, spring 13, washer 14, and gasket 15 are then placed over the rod and the nut 16 is secured in place compressing the spring 13 to a desired degree. The open end of the housing 1 is then closed by the closure member described and the apparatus is assembled complete. It will be noted that relatively little machine work is required, the part 5 and the opening through which it passes being machined and the part 9a threaded, while the opening through the boss 17 is bored for passing the rod 10; and all that remains requiring machining is the drilling of holes for the passage of bolts and the threading of some of the holes for the reception of screws 21. The construction is of simple manufacture and may be very economically produced.

After the assembly has been completed and before any strains are placed upon the tow hook the parts occupy the positions shown in Fig. 1. The housing contains lubricant which is forced through the fixture at 22, and the spring and all working parts are covered and protected against exposure to the weather, to mud, dust, water or the like. During the operation of towing the spring 13 will be compressed to a greater extent than shown in Fig. 1 and will be substantially as shown in Fig. 3. All of the bearing parts will be lubricated and protected against exposure. On backing up toward the trailer which has been towed the force applied will be in the opposite direction in which case the spring 13 will again be compressed but from the other end, or as shown in Fig. 2. In the one case, as in Fig. 3, the one end of the spring 13 rides against the metal washer 12 as a suitable abutment and in the other against the washer 14 which in turn comes against the inner edges of the closure member 18.

The construction described has proved particularly practical in service. The invention is defined in the appended claims and is to be considered comprehensive of all forms of structure coming within their scope.

I claim:

1. In a construction of the class described, an elongated housing, a member slidably mounted and extending through an end of the housing, a rod extending from said member through the housing, a hook construction carried by the outer end of said member, a washer and gasket around said rod at the inner end of said member, a coiled compression spring around the rod bearing at one end against said washer, a second washer and gasket around the rod at the opposite end of the spring, a nut threaded onto said rod for adjusting the spring and a closure member closing the other end of said housing and comprising a boss through which the rod slidably passes and a cup-like portion extending into the housing and against which the second mentioned gasket and washer bear.

2. In a construction of the class described, a support comprising a housing, a member slidably mounted lengthwise of said housing, spring means within said housing associated with said member and housing to yieldingly resist longitudinal movement of said member in either direction, said housing having reservoir means adjacent said housing and closure means operated by the movement of the member in one direction to place the reservoir in communication with the housing.

3. A combination of elements as set forth in claim 2 in which said reservoir has an open space at all times regardless of the position of said longitudinal member and in which a lubricant entering fixture is carried at one side of the housing proper.

4. In a cushion tow hook of the class described comprising, a housing, a member slidably mounted therein, spring means within said housing associated with said member and housing to yieldingly resist longitudinal movement of said member, a washer encircling the said member, said washer dividing the housing into two chambers when the tow hook is inoperative, means leading to one of said chambers whereby lubricant may be inserted thereinto, and means associated with the washer and the member which it encircles whereby movement of the tow hook to operative position opens a passage between the two chambers.

5. In a device of the class described, a housing of rectangular cross section having an integral wing extending upwardly at right angles thereto at one end of the housing, a member slidably mounted within the housing, spring means for yieldably holding the sliding member in position, removable closure means at each end of the housing whereby a chamber is formed within the housing and means located at the lower side of the housing whereby a lubricant may be introduced thereinto.

HENRY KETEL.